United States Patent [19]
Eggert, Jr.

[11] 3,792,896
[45] Feb. 19, 1974

[54] CRASH ATTENUATION APPARATUS FOR A SEAT IN A VEHICLE

[75] Inventor: Walter S. Eggert, Jr., Philadelphia, Pa.

[73] Assignee: The Budd Company, Philadelphia, Pa.

[22] Filed: Sept. 20, 1971

[21] Appl. No.: 181,900

[52] U.S. Cl.................... 297/216, 248/399, 248/424
[51] Int. Cl............................................. B60r 21/10
[58] Field of Search........... 297/216, 308, 307, 309; 248/399, 400, 401, 377, 376, 430, 424

[56] References Cited
UNITED STATES PATENTS

| | | | |
|---|---|---|---|
| 2,916,082 | 12/1959 | Wilkinson | 248/376 |
| 2,227,717 | 1/1941 | Jones | 297/216 |
| 3,532,379 | 10/1970 | Reilly | 297/216 |
| 3,577,655 | 5/1971 | Paucoe | 248/377 |
| 1,412,396 | 4/1922 | Fixsen | 248/376 |
| 3,638,896 | 2/1972 | Lindstrom | 248/399 |
| 2,815,064 | 12/1957 | Witzel | 248/376 |

*Primary Examiner*—Francis K. Zugel

[57] ABSTRACT

Deceleration apparatus for a seat in a vehicle mounted for rocking movement in a truss. Linkages associated with the truss operate to constrain the seat to movement along substantially independent orthogonal axes. Energy absorbing devices connected to the vehicle, the rocker yoke, and truss linkages decelerate movement of the seat and its occupant along the independent axes in the event of a crash of the vehicle.

3 Claims, 7 Drawing Figures

INVENTOR.
WALTER S. EGGERT, JR.
BY
William R. Nolte
AGENT

CRASH ATTENUATION APPARATUS FOR A SEAT IN A VEHICLE

This invention relates to seat deceleration apparatus in a vehicle and more particularly to seat apparatus adapted to attenuate the impact of loads imparted to an occupant in a seat in a vehicle in the event of a crash.

Heretofore it was the practice to provide an arrangement for supporting a seat similar to a tripod in which the legs of the tripod constituted energy attenuators. In such arrangements the vertical attenuator has usually been found to be well oriented but the lateral and longitudinal attenuators, because of their slope, tend to couple and induce seat rotation upon impact of loads being applied along one of the axes. The rotation is induced because there is no positive constraint which causes the seat to move only along the axis.

In other arrangements it was the practice to provide load attenuating seat apparatus yieldable only in one direction in the event of a crash while being substantially rigid in other directions. The apparatus so provided could absorb loads applied to an occupant in this one direction but were ineffective to yield to loads applied in any of other directions. Thus whenever loads in excess of a given magnitude were applied to the occupant through the seat, the occupant was often injured.

The present invention provides a seat for an occupant of a vehicle which is capable of absorbing a peak impact load within a given range of magnitude, regardless of its direction, so that the effective load imparted to the occupant is minimized to a tolerable value. To accomplish this end the seat is mounted in rocker yoke means which in turn is supported by a truss linkage to the floor of the vehicle. The truss linkage is rotatable fore and aft, and swingable laterally about a universal mount at one end in such a manner that the occupant of the seat is maintained in a substantially level relationship, without introducing rotation or coupling movements upon impact. Independent energy absorbing means disposed along the three independent axes attenuate forces to which the occupant is subjected.

Therefore a primary object of this invention is to provide a new and improved impact attenuating apparatus for a seat of a vehicle which avoids one or more of the disadvantages of the prior art structures.

Another important object of this invention is to provide an improved attenuating apparatus for a seat which is adapted to absorb the impact of peak loads resulting from a crash of the vehicle.

Another important object of this invention is the provision of a new and improved tri-axial energy attenuated seat having capabilities for independent energy attenuation along each of its axes.

Another important object of this invention is the provision of a new and improved seat support link apparatus adapted to absorb peak energy loads such that the center of mass of the seat and its occupant relative to the floor mountings of the seat will not induce rotations or cross-couplings in the seat structure upon impact of the vehicle.

Figure 1:
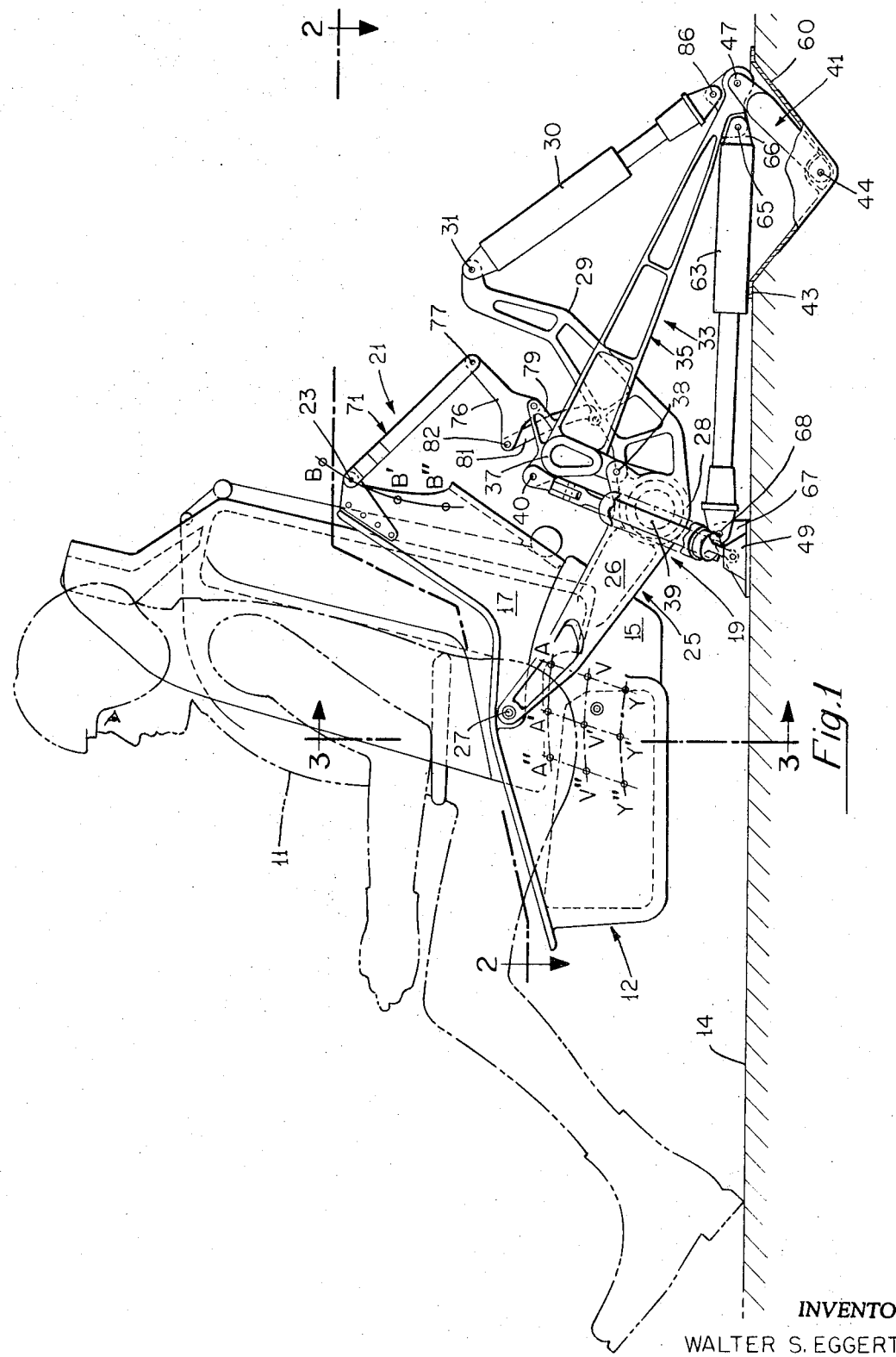
FIG. 1 is a side elevational view partially in section of a seat supported above the floor of a vehicle by the impact attenuating apparatus of the present invention.
Figure 2:
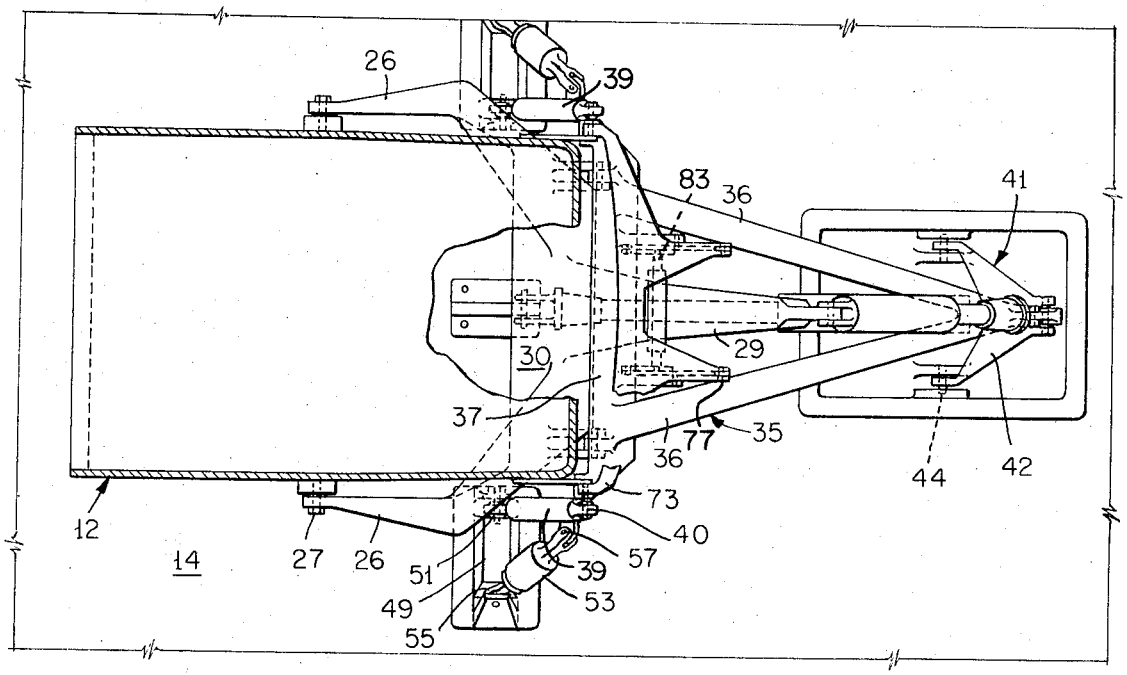
FIG. 2 is a sectional view in plan taken along the lines 2—2 of FIG. 1.
Figure 3:
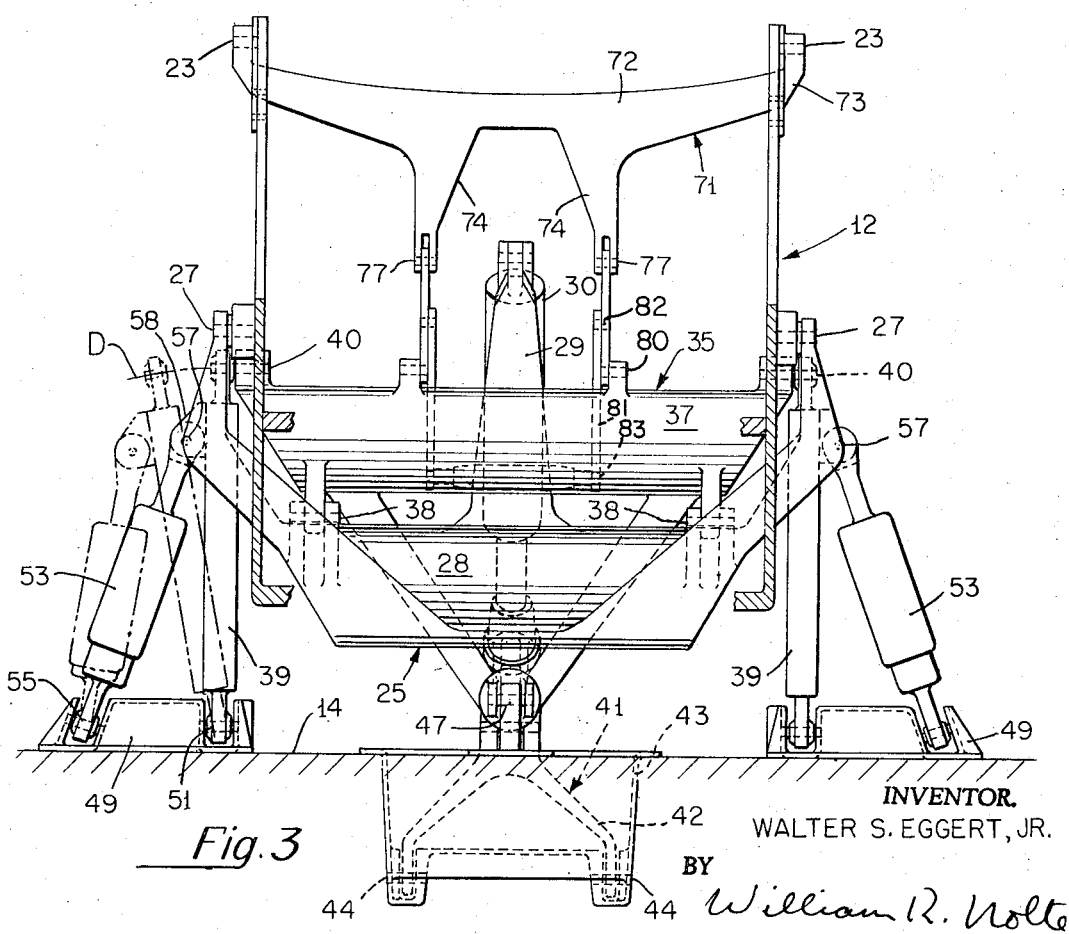
FIG. 3 is a sectional view in elevation taken along the lines 3—3 of FIG. 1.

With reference now to FIGS. 1, 2, and 3 of the drawings the crash attenuation apparatus of the present invention is illustrated in connection with an occupant 11 seated in a seat 12 above the floor 14 of a vehicle. The vehicle may be in the form of an aircraft, helicopter, truck, automobile or the like. The seat includes sides 15, and an upwardly extending back portion 17. The seat is supported by attenuation apparatus 19 of the present invention and is constrained to move for example in a generally level fore and aft attitude as illustrated by way of example along the locus of points A, A', A'', locus V, V', V'' and locus Y, Y', Y''. Correspondingly the seat is movable vertically for example along vertical locii AVY, A'V'Y' and A''V''Y''. As illustrated, and due to the geometry of the apparatus selected, the locii are of generally flat curvature and approach or approximate within limits, a straight line relationship. In order to prevent the seat from tilting in a fore and aft direction about the aforementioned points A,V,Y etc., stabilizing linkage means 21 are connected between the attenuation apparatus 19 and the seat back 17. The linkage means 21 is pin connected as at 23 to the upper opposite sides of seat back 17. The linkage 21 functions to maintain the seat back in a generally vertical attitude as illustrated by the locus of points B, B'', B''. The stabilizing linkage thus serves to program the movement of point B through the same vertical and horizontal movement as point A.

With reference now to the figures of the drawings it is seen that the attenuation apparatus 19 of the present invention includes a rocker yoke 25 which includes a bifurcated portion having a pair of forward arms 26 embrace the sides 15 of the seat and are fastened by means of pin connections 27 on opposite sides of the seat base. The arms 26 converge rearwardly to join a central portion 28 of the yoke. A rear arm 29 extends from the lateral midpoint of the central portion and in the opposite direction as said forward arms and is pin connected as at 31 to the upper end of a vertical attenuator 30. As best seen in FIG. 1 the forward arms 26 slope generally upwardly from the central portion to the seat connection 27, while the rear arm 28 bows upwardly and rearwardly to be seen in FIG. 1 the forward arms 26 slope generally upwardly from the central portion to the seat connection 27, while the rear arm 28 bows upwardly and rearwardly to be secured to the top portion of the vertical attenuator 30.

The rocker yoke 25 is mounted for translatory movement longitudinally, vertically and laterally relative to the floor of the vehicle. For this purpose swingable truss means 33 are provided. The truss means 33 include a generally triangular shaped truss frame 35. The frame includes side arms 36 which are joined together at their rear extremities and which diverge in a forward direction to merge with opposite sides of a lateral frame portion 37. As seen in FIG. 3 the laterally extending central portion 28 of the rocker yoke 25 is suspended beneath the lateral portion 37 of truss 33 for fore and aft rocking movement about a lateral horizontal axis by means of pin connections 38. The forward end of the truss frame 35 is supported by a pair of upright forward links or elements 39 by means of horizontally disposed pins 40, see FIG. 3. The rear end of the truss frame is supported for swinging movement by rear link element 41. The latter element is bifurcated in form and includes a pair of downwardly arms 42 affixed at their lower extremities to a well fitting 43 recessed with the floor 14 of the vehicle. The rear link element 41 is suitably pin connected to the well fitting as at 44 to rotate in a fore and aft direction about a lateral horizontally disposed axis. The upper end of the rear fitting is suitably connected to the rear portion of the triangular truss link member 41 by means of a spherical or ball socket fitting which includes a pin 47 for a purpose to be later described in connection with FIG. 6. The lower ends of the forward links 39, see FIG. 3, also received in laterally disposed floor fittings 49.

As best seen in FIG. 3 the lower end of each of the forward links 39 is illustrated as being fastened to the inboard portion of its corresponding floor fitting by means of a suitable spherical bearing connection 51. Thus upon lateral swinging movement of the truss 35 about its rear spherical bearing connection 47 the upper ends of the links 39 confine and constrain movement of two truss means and the yoke and seat suspended thereon to an approximately level attitude. It is noted that the top of the link 39 is confined to a relatively flat curvature as indicated by the curve D. In order to absorb lateral energy imparted to the seat and occupant in the event of a crash of the vehicle or the like lateral attenuation means 53 are provided. The energy absorber or attenuators contemplated for use in the present invention may be a type of vehicle and landing gear shock absorber for control of body and seat loads during crash. Such units may be of the class having a sliding tube enclosing a retardant such as a frictional device, hydraulic or pneumatic, viscous or dynamic i.e., acceleration pressure drop. Such devices may further be of the class involving plastic deformation, extrusions, torsion, or collapsible hinges. The lateral energy device as presently illustrated includes a spherical fitting 55 connecting its lower end to the floor fittings 49. The upper end of each of the lateral actuators is secured by means of a suitable pin connection 57 to an ear 58 projecting outwardly from the upper end of the previously referred to forward links 39 of the swingable truss means 33.

Figure 4:
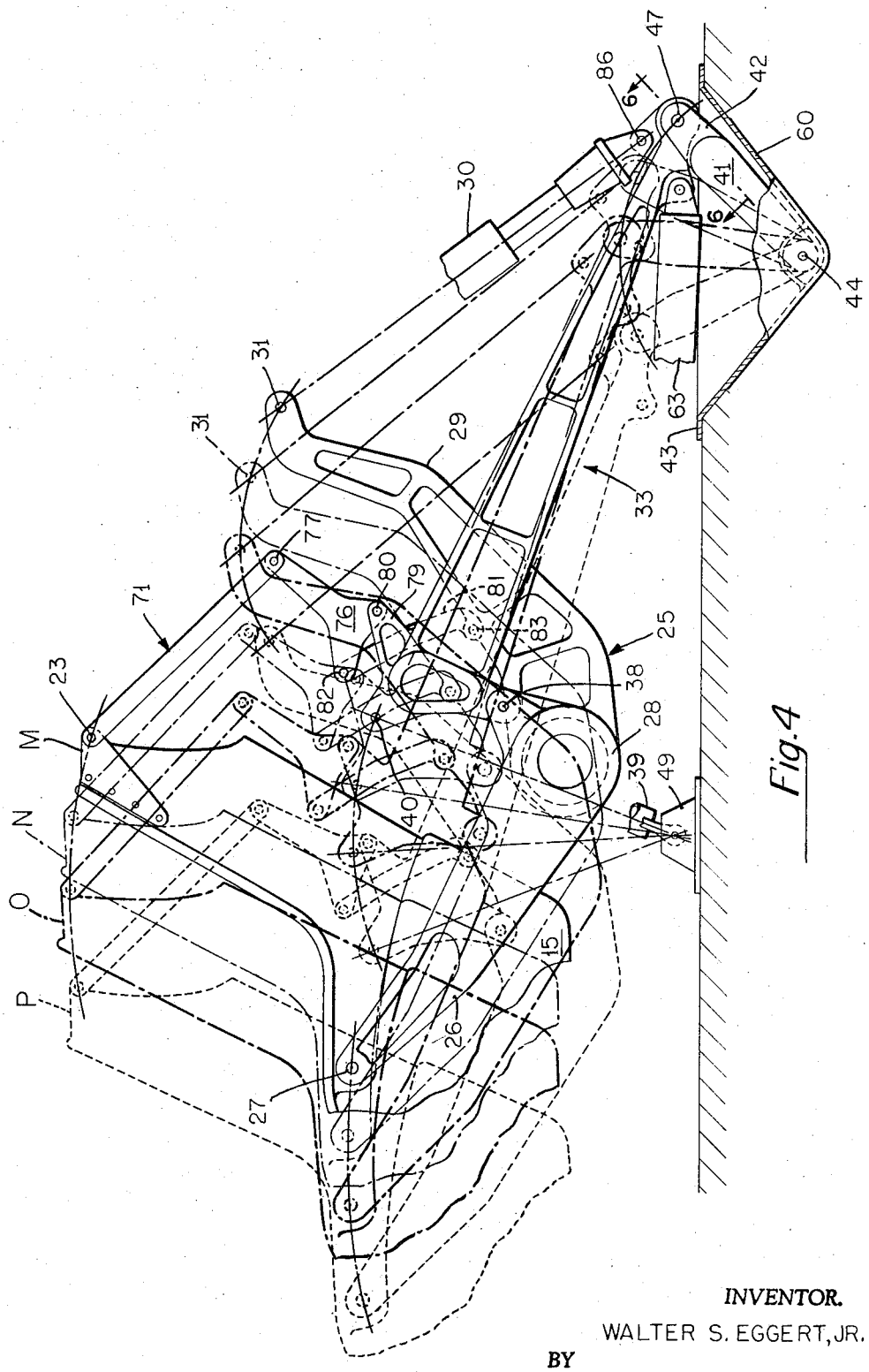
FIG. 4 is an elevational view of the attenuating apparatus similar to FIG. 1 and shows various positions of movement of the seat apparatus in a longitudinal direction.

With reference now to FIGS. 1, 2 and 4, various positions of the truss means 33 which support the rocker yoke 25 are illustrated. In the full line or normal at rest position of the truss means 33, FIG. 4, the rear link 41 is shown aligned with the rear wall 60 of the well fitting 43. Due to longitudinal acceleration forces, the truss means reacting to diferent mangitudes of forces is caused to be shifted forward about forward link 39 and rear link 41. The seat 15 may thus assume positions designated as at M, N, O and P. It is seen that the seat is translated through an arcuate movement of very flat curvature approaching a straight line or level attitude. In order to decelerate the longitudinal forward movement of the seat and occupant, longitudinal energy absorbing means 63 are provided. The latter is illustrated as being in the form of cylindrical device having its rear portion pin connected as at 65 to a tongue portion 66 extending downwardly from the bottom rear end portion of truss member 35 while its forward end portion is pin connected to floor fitting 67 by pin connection 68.

Figure 5:
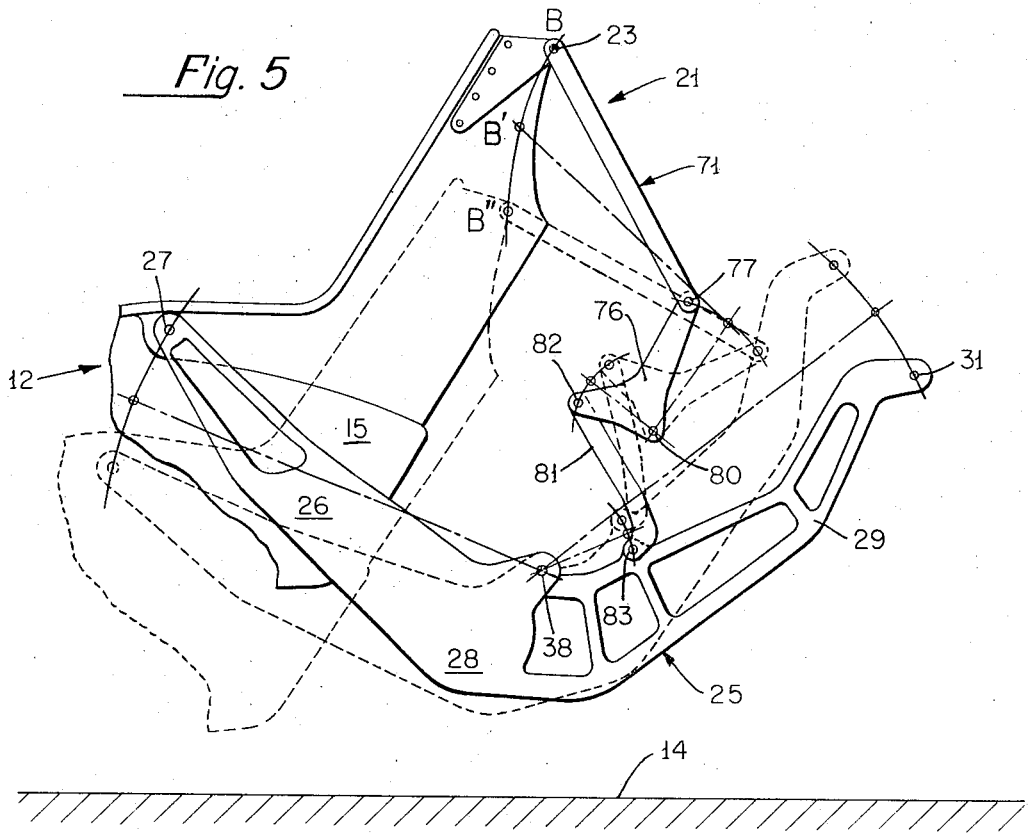
FIG. 5 is an elevational view of the attenuating apparatus showing rocker yoke rotated to position the seat to various vertical positions.

With reference now to FIGS. 2, 3, and 5, and as previously indicated, stabilizing linkage means 21 are mounted between the rocker yoke means 25 and the upper portion of the seat back 17 to maintain the seat level and the seat back 17 in a generally vertical position. For this purpose the levelling linkage is shown as including an upper yoke member 71 having a main body portion 72 conforming in curvature to the upper portion of the seat back terminating in opposite ends in forwardly extending ear portions 73 which are pin connected as at 23 as previously mentioned. A pair of arms 74 extend rearwardly and downwardly from the central portion 72 of the yoke and each extremity thereof receives a belcrank 76 pin connected at the end of its upright arm as at 77. The lower end of the belcrank is fulcrumed to upwardly projecting lug portion 79 of truss frame 35 by pivot pin 80. The extremity of the forwardly extending arm portion of the belcrank receives a link member 81 pin-connected thereto as at 82. The lower end of link member 81 in turn is pivotally connected to yoke arm 29 as at 83. Upon forward rocking movement, FIG. 5, of the rocker yoke 25 about truss pin 80 as represented by the positions Q, Q1, Q2 etc., it is observed that the upper pivot connection 23 of the top portion of the seat back is caused to be programmed correspondingly through points B, B' and B'' to maintain a substantially level attitude of the seat. With reference now to FIG. 1, the previously referred to vertical energy absorber 30 is pin connected as at 86 to lug portion 85 projecting upwardly from the rear portion of truss frame 33 and is effective to decelerate vertical movement of the seat and occupant in the event of a crash of the vehicle.

Figure 6:
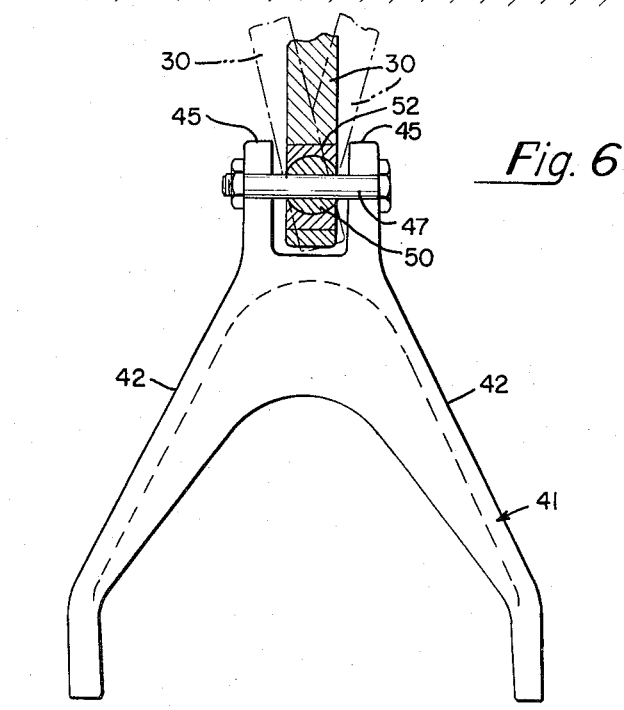
FIG. 6 is a cross sectional view taken along line 6—6 of FIG. 4.
Figure 7:
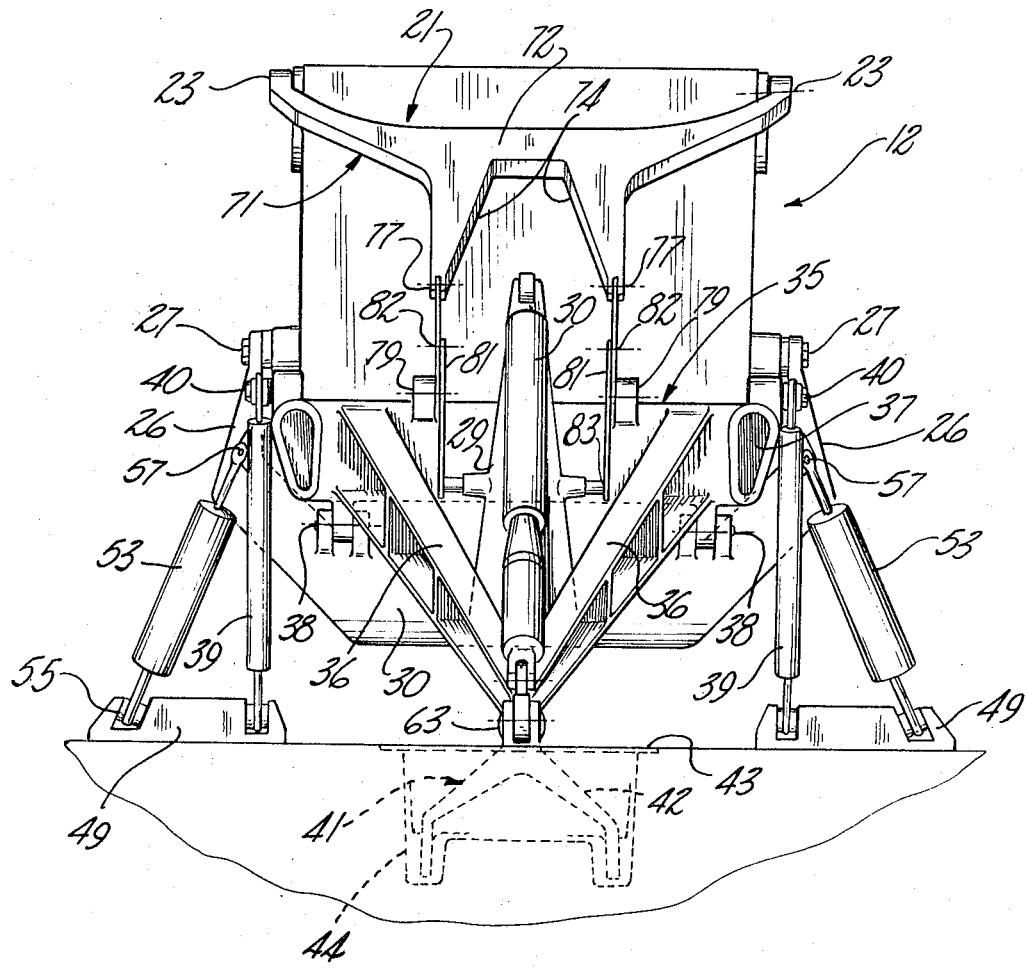
FIG. 7 is a rear of the seat illustrated in FIG. 1.

Referring to FIG. 6, the ball and socket arrangement to permit lateral movement at the seat is illustrated. End portions 45 include apertures to receive the pin 47 therethrough. A ball element 50 has an opening to permit the pin 47 to be passed therethrough and is locked into the position illustrated by a press fit or other means.

The ball element 50 is disposed to be angularly moved on a bearing 52 having a spherical surface corresponding to the spherical surface of the ball element 50. When the seat including the arm 30 is moved laterally, actually through a slightly accurate direction, the bearing 52 will be angularly moved.

While there has been described what at present is considered to be the preferred embodiment of this invention, it will be obvious to those skilled in the art that various changes and modifications may be made therein without departing from the invention, and it is aimed to cover all such changes and modifications as fall within the scope of the invention.

What is claimed is:

1. Crash attenuation apparatus for mounting a seat to the floor of a vehicle and for maintaining said seat substantially parallel to said floor when said seat is subjected to vertical, longitudinal or lateral forces, vertical, longitudinal and lateral energy absorbing devices associated with said seat to absorb energy when said seat is subjected to any of said vertical, longitudinal or lateral forces, rocker yoke means to maintain said seat parallel to said floor when said seat is subjected to said vertical forces, said rocker means including a forward end pivotally attached to said seat and a rear end pivotally mounted to said vertical energy absorbing device, truss means including forward and rear links attached thereto to maintain said seat substantially parallel to said floor when said seat is subjected to longitudinal forces, said truss means being pivotally mounted to said rocker yoke means with said longitudinal energy absorbing device being connected between said floor and said truss means, said forward and rear links being of predetermined lengths with respect to each other to maintain said seat substantially parallel to said floor when said seat is subjected to said longitudinal forces, said forward links further providing means for maintaining said seat substantially parallel to said floor when said seat is subjected to lateral forces.

2. The invention as set forth in claim 1 wherein said vertical energy absorbing device is connected between said rocker yoke means and said truss.

3. The invention as set forth in claim 2 wherein said lateral energy absorbing devices are connected between the tops of said forward links and said floor.

* * * * *